Patented Oct. 14, 1947

2,429,184

UNITED STATES PATENT OFFICE 2,429,184

PROCESS OF MAKING p-AMINOBENZENE-SULPHONAMIDOPYRIMIDINES

Max Hartmann, Riehen, Harald von Meyenburg, Basel, and Jean Druey, Riehen, Switzerland, assignors to Ciba Pharmaceutical Products, Incorporated, Summit, N. J., a corporation of New Jersey No Drawing. Application March 9, 1943, Serial No. 478,554. In Switzerland March 5, 1942

5 Claims. (Cl. 260—239.6)

It is known that p-aminobenzenesulphonamidopyrimidines can be prepared by causing certain benzesulphonic acid halides to react with aminopyrimidines and, if necessary, forming the amino group in the resultant aminopyrimidines substituted by one benzenesulphonyl radical.

The surprising observation was made that, in this reaction, under certain conditions, 2-, or 4-(identical with 6)-aminopyrimidines substituted by two identical benzenesulphonyl radicals are formed from the corresponding 2- or 4(identical with 6)-aminopyrimidines.

It has now been found that p-aminobenzenesulphonamidopyrimidines can also be obtained when a 2- or 4(identical with 6)-aminopyrimidine, which is substituted with two identical benzenesulphonyl radicals whose benzene nuclei contain in the p-position amino-groups or substitutents capable of conversion into amino-groups, is treated with hydrolyzing agents or is caused to react with the aminopyrimidine from which the aminopyrimidine substituted with two sulphonyl radicals used for the reaction is derived, and if necessary, converting into amino groups the said substituents capable of conversion into amino groups in the product obtained.

On treatment with hydrolyzing agents one of the benzenesulphonyl radicals is, surprisingly, split off and one molecule of the final product is obtained from one molecule of the initial product. If the reaction is carried out with the aminopyrimidine mentioned, one of the benzenesulphonyl radicals is similarly split off. Two molecules of benzene-sulphonamidopyrimidine are, however, formed from one molecule of di-substituted amidopyrimidine.

As starting product can be used any 2- or 4(identical with 6)-aminopyrimidine which is substituted with two identical benzenesulphonyl radicals and whose benzene nuclei contain in the p-position amino groups or substituents convertible into such, e. g. acylamino-, nitro- or azo-groups or halogen atoms. In particular the following substances may be mentioned: Bis-N-(p-acylaminobenzenesulphonyl) - 2 - aminopyrimidines, such as bis-N-(p-acetylaminobenzenesulphonyl)- or bis-N-(p-nitrobenzenesulphonyl)-2-aminopyrimidine, -2-amino - alkylpyrimidines, such as -2-amino-4-methyl-pyrimidine, -2-amino-4,6-dimethyl-pyrimidine, and -6-amino-alkyl-pyrimidines, such as -6-amino-2,4-dimethylpyrimidine.

The treatment with hydrolyzing agents can be carried out in the usual way, e. g. by heating with a base or acid in water. It is also possible, however, to heat in an organic solvent or diluent, e. g. alcohol, in the presence of a hydrohalide.

The reaction with the aminopyrimidine mentioned is most suitably carried out in an organic solvent, preferably in pyridine, by heating to a high temperature.

Known methods may be used for converting into amino groups the substituents capable of conversion into amino groups. Acylamino compounds, for example, are saponified, nitro- or azo-compounds reduced, and halogen compounds caused to react with ammonia.

In order to prepare the aminopyrimidines substituted with two benzosulphonyl radicals which are used as starting products, a 2- or 4(identical with 6)-aminopyrimidine can be caused to react in an organic solvent in the presence of strong bases at ordinary or increased temperature (particularly at 40–60° C.) with a reactive benzenesulphonic acid derivative, in particular a halide, e. g., a chloride which possesses in the p-position an amino group or a substituent capable of conversion into an amino group, e. g. an acylamino-, nitro- or azo-group or a halogen atom. The reaction can be advantageously carried out in pyridine.

The products of the reaction find use a medicaments or as intermediate products in the manufacture of such.

The following examples illustrate the invention, the parts being by weight:

*Example 1*

49.3 parts of bis-N-(p-nitrobenzenesulphonyl)-6-amino-2,4-dimethyl-pyrimidine are heated to boiling for one hour with 12.3 parts of 6-amino-2,4-dimethylpyrimidine in 50 parts of dry pyridine. After cooling, the 6-(p-nitro-benzenesulphonamido)-2,4-dimethyl-pyrimidine formed is precipitated with water and filtered off by suction. It is purified by dissolving in dilute caustic soda and precipitating with acid. On recrystallization from dilute alcohol it melts (with decomposition) at 188–189° C.

On reduction, for example with iron and hydrochloric acid, 6-(p-aminobenzene sulphonamido-2,4-dimethyl-pyrimidine, melting point 236° C., is obtained.

The starting product can be prepared as follows:

123 parts of finely powdered 6-amino-2,4-dimethyl-pyrimidine are suspended in 250 parts of dry pyridine and 222 parts of p-nitro-benzenesulphonyl chloride added at 50–55° C. The whole is then warmed for 2 hours to 55° C. Water is added to the crystalline aggregate obtained, the precipitated bis-N-(p - nitrobenzenesulphonyl)-6-amino-2,4-dimethyl-pyrimidine filtered off by suction and washed with water. It is purified by recrystallizing from methyl-ethyl ketone. On slowly heating it decomposes; on rapidly heating it melts at about 210–215° C. with decomposition.

Example 2

49.3 parts of bis-N-(p-nitrobenzenesulphonyl)-6-amino-2,4-dimethylpyrimidine are boiled under reflux with 140 parts by volume of 2N caustic soda solution until a clear solution is obtained. After cooling, it is neutralized with concentrated hydrochloric acid. In this way 6-(p-nitrobenzenesulphonamido)-2,4 - dimethylpyrimidine is obtained, which is purified as described in Example 1 and can be converted by reduction into 6-(p-aminobenzenesulphonamido)-2,4-dimethylpyrimidine.

Example 3

51.7 parts of bis-N-(p-acetylaminobenzenesulphonyl)-6-amino-2,4 - dimethylpyrimidine are heated to boiling for 3 hours under reflux with 12.3 parts of 6-amino-2,4-dimethylpyrimidine in 50 parts of dry pyridine. After cooling, plenty of water is added and the precipitated 6-(p-acetylaminobenzenesulphonamido) - 2,4 - dimethylpyrimidine filtered off by suction. It can be recrystallized from 50% acetic acid, and melts with decomposition at 310° C.

On saponification of the acetyl group, e. g. on boiling with dilute caustic soda solution, 6-(p-aminobenzenesulphonamido) - 2,4 - dimethylpyrimidine is obtained. It can be recrystallized from dilute alcohol and melts at 236° C.

The starting product can be prepared as follows:

120 parts of p-acetylaminobenzenesulphonyl chloride are introduced at 50–55° C. into a suspension of 123 parts of finely powdered 6-amino-2,4-dimethylpyrimidine in 200 parts of dry pyridine. After it has all been added, the temperature is kept at 55° C. for one hour and then heated for one hour to 90–95° C. The pyridine is removed by heating in vacuo on a water-bath. The residue is triturated with warm water and filtered off by suction, thoroughly stirred up with dilute caustic soda solution, again filtered off and washed with water. After recrystallization from methyl-ethyl ketone, the bis-N-(p-acetylaminobenzenesulphonyl)-6-amino-2,4-dimethylpyrimidine decomposes above 225° C. to an increasing extent with rising temperature.

Example 4

51.7 parts of bis-N-(p-acetylaminobenzenesulphonyl)-6-amino-2,4-dimethylpyrimidine are boiled under reflux with 250 parts by volume of 2N caustic soda solution until solution is complete. The solution is boiled for a further 30 minutes, thoroughly stirred up with animal charcoal, filtered and 6-(p-aminobenzene-sulphonamido) - 2,4 - dimethylpyrimidine precipitated from the filtrate with hydrochloric acid. After recrystallization from dilute alcohol it melts at 236° C.

Example 5

49.3 parts of bis-N-(p-nitrobenzenesulphonyl)-2-amino-4,6-dimethylpyrimidine are boiled under reflux for several hours with 100 parts by volume of 5N caustic soda solution until solution occurs. While still hot, it is diluted with 400 parts of hot water and then filtered hot. The 2 - (p-nitrobenzenesulphonamido) - 4,6 - dimethyl-pyrimidine is precipitated from the filtrate with hydrochloric acid. It can be recrystallized from dilute alcohol, and melts at 208–210° C.

The same substance is obtained when bis-N-(p-nitrobenzene - sulphonyl) - 2 - amino - 4,6-dimethylpyrimidine is caused to react with 2-amino-4,6-dimethylpyrimidine in pyridine.

On reduction with iron and hydrochloric acid, 2-(p-aminobenzenesulphonamido)-4,6-dimethylpyrimidine, melting point 177° C., is obtained.

The starting product is obtained in the following way:

222 parts of p-nitrobenzene-sulphonyl chloride are added to 61.5 parts of 2-amino-4,6-dimethylpyrimidine in 100 parts of dry pyridine at 55° C. and heated for a few hours to 60° C. The mixture is then diluted with plenty of water and the precipitate filtered off by suction. The residue is suspended with dilute caustic soda, filtered off by suction, washed with water and then with acetone. A bright, slightly soluble powder is obtained which can be recrystallized from methyl-ethyl ketone and melts at 230–232° C. with decomposition.

2-(p-aminobenzenesulphonamido)-pyrimidine can be prepared in an analogous way from the corresponding parent product. It melts at 255° C.

What we claim is:

1. A process for the manufacture of a para-aminobenzenesulphonamidopyrimidine, which comprises reacting one mol of a member selected from the group consisting of the 2- and 4-aminopyrimidines at a temperature of about 40–60° C. with two mols of a benzenesulphonic acid halide, wherein the benzene nucleus contains in the para-position a member selected from the group consisting of amino, acylamino, nitro and azo, and treating the resultant aminopyrimidine which is substituted by two identical benzenesulphonyl radicals containing in para-position the selected substituent, with the aminopyrimidine selected for the reaction with the benzene sulphonic acid halide.

2. A process for the manufacture of a para-aminobenzenesulphonamidopyrimidine, which comprises reacting one mol of 2-aminopyrimidine at a temperature of about 40–60° C. with two mols of a para-nitrobenzenesulphonyl halide, treating the resultant bis-N-(para-nitrobenzenesulphonyl)-2-aminopyrimidine with 2 - aminopyrimidine in the presence of pyridine, and then treating the product with a reducing agent.

3. A process for the manufacture of 6-(para-aminobenzenesulphonamido)-2,4 - dimethylpyrimidine, which comprises reacting one mol of 6-amino-2,4-dimethylpyrimidine at a temperature of about 40–60° C. with two mols of a para-nitrobenzenesulphonyl halide, treating the resultant bis-N-(para-nitrobenzenesulphonyl) - 6 - amino-2,4-dimethylpyrimidine with 6-amino - 2,4 - dimethylpyrimidine in the presence of pyridine, and then treating the resultant product with a reducing agent.

4. A process for the manufacture of 6-(para-aminobenzenesulphonamido) - 2,4 - dimethylpyrimidine, which comprises reacting one mol of 6-amino-2,4-dimethylpyrimidine at a temperature of about 40–60° C. with two mols of a para-acetylaminobenzenesulphonyl halide, treating the resultant bis - N - (para-acetylaminobenzenesulphonyl)-6-amino-2,4-dimethylpyrimidine with 6-amino-2,4-dimethylpyrimidine in the presence of pyridine, and then treating the resultant product with a hydrolyzing agent.

5. A process for the manufacture of 2-(para-aminobenzenesulphonamido)-4,6-dimethylpyrimidine, which comprises reacting one mol of 2-amino-4,6-dimethylpyrimidine at a temperature of about 40–60° C. with two mols of a para-nitrobenzenesulphonyl halide, treating the resultant bis-N-(para-nitrobenzenesulphonyl)-2-amino-4,6-dimethylpyrimidine with 2-amino-4,6-dimethylpyrimidine in the presence of pyridine, and then treating the resultant product with a reducing agent.

MAX HARTMANN.
HARALD von MEYENBURG.
JEAN DRUEY.

REFERENCES CITED

The following references are of record in the file of this patent:

UNITED STATES PATENTS

| Number | Name | Date |
|---|---|---|
| 2,097,414 | Kharasch et al. | Oct. 26, 1937 |
| 2,133,787 | Northey | Oct. 18, 1938 |
| 2,275,354 | Ewins | Mar. 3, 1942 |
| 2,309,870 | Solomon | Feb. 2, 1943 |
| 2,322,974 | Solomon | June 29, 1943 |
| 2,351,333 | Gysin | June 13, 1944 |

OTHER REFERENCES

Journal Amer. Chem. Soc., vol. 63, pages 578–580; (Feb. 1941); ibid., pages 3028–3030, 3124–3126 (Nov. 1941); ibid., vol. 64, pages 2340–2342 (Oct. 1942); ibid., vol. 62, pages 2002–2005 (Aug. 1940); ibid., vol. 63, pages 2188–2190 (Aug. 1941).

Schriner and Fuson, "Identification of Organic Compounds," 2nd ed. (John Wiley, New York, 1940); page 48.

Certificate of Correction

Patent No. 2,429,184.    October 14, 1947.

MAX HARTMANN ET AL.

It is hereby certified that errors appear in the printed specification of the above numbered patent requiring correction as follows: Column 2, line 28, for "use a" read *use as*; line 48, after the syllable "amido" insert a closing parenthesis; and that the said Letters Patent should be read with these corrections therein that the same may conform to the record of the case in the Patent Office.

Signed and sealed this 16th day of December, A. D. 1947.

[SEAL]

THOMAS F. MURPHY,
*Assistant Commissioner of Patents.* pyridine, and then treating the resultant product with a hydrolyzing agent.

5. A process for the manufacture of 2-(para-aminobenzenesulphonamido)-4,6-dimethylpyrimidine, which comprises reacting one mol of 2-amino-4,6-dimethylpyrimidine at a temperature of about 40–60° C. with two mols of a para-nitrobenzenesulphonyl halide, treating the resultant bis-N-(para-nitrobenzenesulphonyl)-2-amino-4,6-dimethylpyrimidine with 2-amino-4,6-dimethylpyrimidine in the presence of pyridine, and then treating the resultant product with a reducing agent.

MAX HARTMANN.
HARALD von MEYENBURG.
JEAN DRUEY.

REFERENCES CITED

The following references are of record in the file of this patent:

UNITED STATES PATENTS

| Number | Name | Date |
|---|---|---|
| 2,097,414 | Kharasch et al. | Oct. 26, 1937 |
| 2,133,787 | Northey | Oct. 18, 1938 |
| 2,275,354 | Ewins | Mar. 3, 1942 |
| 2,309,870 | Solomon | Feb. 2, 1943 |
| 2,322,974 | Solomon | June 29, 1943 |
| 2,351,333 | Gysin | June 13, 1944 |

OTHER REFERENCES

Journal Amer. Chem. Soc., vol. 63, pages 578–580; (Feb. 1941); ibid., pages 3028–3030, 3124–3126 (Nov. 1941); ibid., vol. 64, pages 2340–2342 (Oct. 1942); ibid., vol. 62, pages 2002–2005 (Aug. 1940); ibid., vol. 63, pages 2188–2190 (Aug. 1941).

Schriner and Fuson, "Identification of Organic Compounds," 2nd ed. (John Wiley, New York, 1940); page 48.

Certificate of Correction

Patent No. 2,429,184.                                October 14, 1947.

MAX HARTMANN ET AL.

It is hereby certified that errors appear in the printed specification of the above numbered patent requiring correction as follows: Column 2, line 28, for "use a" read *use as*; line 48, after the syllable "amido" insert a closing parenthesis; and that the said Letters Patent should be read with these corrections therein that the same may conform to the record of the case in the Patent Office.

Signed and sealed this 16th day of December, A. D. 1947.

[SEAL]

THOMAS F. MURPHY,
*Assistant Commissioner of Patents.*